US009180517B2

(12) United States Patent
Takahashi et al.

(10) Patent No.: US 9,180,517 B2

(45) Date of Patent: Nov. 10, 2015

(54) POWDER MAGNETIC CORE

(75) Inventors: Takeshi Takahashi, Tokyo (JP); Seigo Tokoro, Tokyo (JP)

(73) Assignee: TDK CORPORATION, Tokyo (JP)

( * ) Notice: Subject to any disclaimer, the term of this patent is extended or adjusted under 35 U.S.C. 154(b) by 234 days.

(21) Appl. No.: 13/238,698

(22) Filed: Sep. 21, 2011

(65) Prior Publication Data

US 2012/0082844 A1 Apr. 5, 2012

(30) Foreign Application Priority Data

Sep. 30, 2010 (JP) ................................ 2010-222132
Feb. 9, 2011 (JP) ................................ 2011-026134

(51) Int. Cl.

| | |
|---|---|
| ***B32B 5/16*** | (2006.01) |
| ***B32B 7/02*** | (2006.01) |
| ***B22F 1/02*** | (2006.01) |
| ***H01F 1/24*** | (2006.01) |
| ***H01F 1/33*** | (2006.01) |

(52) U.S. Cl.

CPC .. *B22F 1/02* (2013.01); *H01F 1/24* (2013.01); *H01F 1/33* (2013.01); *B22F 2999/00* (2013.01); *C22C 2202/02* (2013.01); *Y10T 428/265* (2015.01); *Y10T 428/2991* (2015.01)

(58) Field of Classification Search

None

See application file for complete search history.

(56) References Cited

U.S. PATENT DOCUMENTS

| | | | | |
|---|---|---|---|---|
| 2003/0077448 | A1 * | 4/2003 | Ueta et al. | 428/403 |
| 2003/0230362 | A1 * | 12/2003 | Tajima et al. | 148/105 |
| 2007/0235109 | A1 | 10/2007 | Maeda et al. | |
| 2008/0029300 | A1 * | 2/2008 | Harada et al. | 174/391 |
| 2009/0116990 | A1 * | 5/2009 | Unoki et al. | 419/19 |
| 2010/0044618 | A1 * | 2/2010 | Ishimine et al. | 252/62.55 |

FOREIGN PATENT DOCUMENTS

| | | |
|---|---|---|
| JP | A-2006-128663 | 5/2006 |
| JP | A-2009-185312 | 8/2009 |
| JP | A-2010-123699 | 6/2010 |

OTHER PUBLICATIONS

Apr. 22, 2014 Office Action issued in Japanese Patent Application No. 2011-026134 w/translation.

* cited by examiner

*Primary Examiner* — Alexandre Ferre

(74) *Attorney, Agent, or Firm* — Oliff PLC

(57) ABSTRACT

A powder magnetic core having a high electrical resistivity and a high magnetic flux density, including at least a composite magnetic particle the composite magnetic particle including: a core particle containing iron as the main component; and an insulating passivation layer formed on the core particle, wherein: the insulating passivation layer at least has an inner layer formed on the core particle and the outermost layer formed on the inner layer; and the outermost layer contains iron oxide as the main component.

6 Claims, 6 Drawing Sheets

POWDER MAGNETIC CORE

CROSS-REFERENCES TO RELATED APPLICATIONS

This application relates to and claims priority from Japanese Patent Application Nos. 2010-222132 and 2011-026134, filed on Sep. 30, 2010 and Feb. 9, 2011, respectively, the entire disclosure of which is incorporated herein by reference.

FIELD OF THE INVENTION

The invention relates to a powder magnetic core.

BACKGROUND OF THE INVENTION

Conventionally, powder magnetic cores have been used as magnetic cores provided in electromagnetic devices such as motors, generators and reactors. In general, the powder magnetic cores of this kind are manufactured by compacting a soft magnetic material (powder) containing iron as the main component on which a thin insulating layer is formed by a phosphate treatment or the like for the purpose of improving the insulation property and increasing the density of magnetic flux. After the compaction, a heat treatment (annealing) is performed in order to release compression strain caused during the compaction and reduce iron loss (core loss).

Powder magnetic cores that are driven in an alternating magnetic field are generally required to exhibit a small core loss. It is effective to increase the temperature in the heat treatment in order to reduce the core loss. However, in a powder magnetic core fabricated using iron powder which has been subjected to an insulating treatment such as a phosphate treatment, since the heat resistance of a phosphoric acid coating is low, the core resistance is likely to be reduced by a heat treatment of 500° C. or higher and eddy-current loss increases, and as a result, the core loss cannot be sufficiently reduced.

In addition, in motors and generators, the powder magnetic core is required to exhibit a high magnetic flux density, and in order to achieve a high magnetic flux density, it is desired that the density of the powder magnetic core be high as long as the same material is used. However, if a compacting pressure is increased in order to increase the density of the core, force acting on particles and on the interface between the particles increases, and thus the insulating layers are destroyed or peeled off, which results in a reduction in an electrical resistivity. As described above, it has been difficult to achieve compatibility between a high magnetic flux density and a high electrical resistivity.

In order to solve this problem, for example, Patent Document 1 discloses a powder magnetic core in which particulate fluoride and a peelable body constituted by iron oxide both exist in an insulating layer. Also, Patent Document 2 discloses a powder magnetic core in which coatings made of an iron phosphate compound and an aluminum phosphate compound.

[Patent Document 1] Japanese laid-open publication No. 2010-123699

[Patent Document 2] Japanese laid-open publication No. 2006-128663

However, in the technique disclosed in Patent Document 1, although the density of a compact is increased by increasing the compacting pressure, the technique has a drawback in that the electrical resistivity cannot be increased. In the technique disclosed in Patent Document 2, the density of magnetic flux of the resulting powder magnetic core is lowered greatly, and thus the technique has a drawback in that the compatibility between a high electrical resistivity and a high magnetic flux density cannot be achieved.

SUMMARY

The present invention has been made in light of the circumstances above, and it is an object of the present invention to provide a powder magnetic core having a high electrical resistivity and a high magnetic flux density.

The inventors of the present invention have committed to intensive research and found that the above problems can be solved by providing a composite magnetic particle in which an insulating passivation layer having a plurality of layers is formed on a core particle containing iron as the main component, and configuring the outermost layer of the insulating passivation layer so as to contain iron oxide as the main component. As a result, the inventors have achieved the present invention.

Namely, the present invention provides a powder magnetic core including at least a composite magnetic particle, the composite magnetic particle including: a core particle containing iron as the main component; and an insulating passivation layer formed on the core particle, wherein: the insulating passivation layer at least has an inner layer formed on the core particle and an outermost layer formed on the inner layer; and the outermost layer contains iron oxide as a main component.

Measuring the properties of the powder magnetic core having the configuration above, the inventors have found that the powder magnetic core has a higher electrical resistivity and higher magnetic flux density as compared to the related art. Although the details of a functional mechanism that contributes to such effects are still unclear, for example, the following presumption can be made.

In the powder magnetic core above, since the core particle is coated with the insulating passivation layer having a plurality of layers and the outermost layer of the insulating passivation layer contains the iron oxide as the main component, the heat resistance, the adhesiveness and the uniformity of the insulating passivation layer are significantly enhanced as compared to the related art. In other words, since the periphery of the core particle is uniformly and sufficiently coated with the insulating passivation layer having two or more layers having excellent heat resistance, adhesiveness and uniformity in the powder magnetic core above, the insulation property and heat resistance thereof are significantly enhanced. Since the outermost layer contains the iron oxide as the main component, the adhesiveness between the composite magnetic particles can be improved and a compact obtained by warm-compacting such composite magnetic particles can achieve a high density. In addition, since the insulating passivation layer contains iron, even if the coating layers have a large thickness, degradation in magnetic properties such as magnetic permeability can be suppressed. With all of these effects combined, it can be considered that degradation in performance due to a high-temperature treatment can be suppressed and a high core resistance (high electrical resistivity) and a high magnetic flux density can be achieved in the powder magnetic core above. However, the effects of the present invention are not limited to those described above.

Note that the insulating passivation layer in the present invention may be constituted by two or more layers, and the insulating passivation layer is not limited to one having one inner layer. For example, two or more inner layers may be formed.

Here, it is preferable that the core particle has a soft magnetic particle containing iron as the main component and an insulating layer formed on a surface of the soft magnetic particle. Since the soft magnetic particle coated with the insulating layer effectively serves as a core particle having an insulation property, a powder magnetic core having high performance can be achieved.

In the configuration above, the insulating layer of the core particle preferably contains iron phosphate. By coating the soft magnetic particle with the insulating layer containing iron phosphate, even higher heat resistance can be provided.

The inner layer preferably contains iron oxide and at least one kind of an oxide of nonferrous metal. With the configuration in which not only the outermost layer but also the inner layer contains the iron oxide, the magnetic properties such as magnetic permeability tend to be further improved. In addition, with the configuration in which both the outermost layer and the inner layer contain iron, the adhesiveness between the layers tends to be improved, and the coating can be provided further uniformly. Furthermore, with the configuration in which the oxide of nonferrous metal is contained, the electric resistance of the insulating passivation layer can be further enhanced.

The nonferrous metal preferably includes at least one kind selected from the group consisting of aluminum, zirconium, silicon, titanium, magnesium, chromium, manganese, sodium, lithium, zinc, barium and cesium, and more preferably includes at least one kind selected from the group consisting of aluminum, zirconium, silicon, titanium and magnesium. By using these nonferrous metals, the insulation property and heat resistance of the core particle can be further enhanced.

The sum of thicknesses of the insulating passivation layer is preferably 50 nm or more and 1.5 μm or less, and more preferably 200 nm or more and 1 μm or less. By setting the thickness of the insulating passivation layer within the above range, the insulation property and heat resistance can be further enhanced.

The present invention provides a powder magnetic core having a high electrical resistivity and a high magnetic flux density.

DETAILED DESCRIPTION OF PREFERRED EMBODIMENTS

Figure 1:
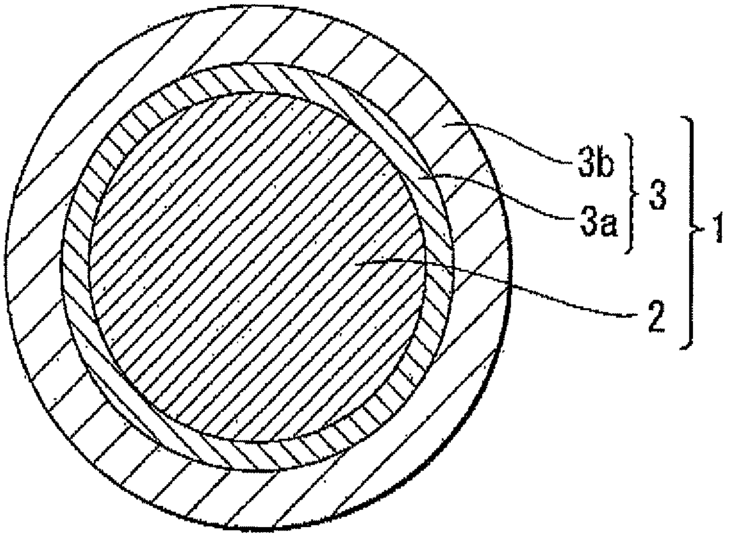
FIG. 1 is a schematic cross-sectional view showing an embodiment of a composite magnetic particle 1 of a powder magnetic core according to the present embodiment.

An embodiment of the present invention (hereinafter, referred to simply as "present embodiment") will be described below. Note that the positional relationship such as upper, lower, right and left is based on the positional relationship shown in the drawings, unless indicated otherwise. In addition, dimensional ratios are not limited to the ratios shown in the drawings. The following embodiment is merely an example for illustrating the present invention, and the present invention should not be limited to the embodiment.

A powder magnetic core according to the present embodiment is an aggregate (a compact) of at least composite magnetic particles 1, and the composite magnetic particle 1 includes a core particle 2 containing iron as the main component and an insulating passivation layer 3 having a plurality of layers formed on the core particle 2, the composite magnetic particle 1 being characterized by its iron oxide in the outermost layer of the insulating passivation layer 3.

FIG. 1 is a schematic cross-sectional view showing an embodiment of the composite magnetic particle according to the present embodiment.

The composite magnetic particle 1 includes the core particle 2 containing iron as the main component and insulating passivation layer 3 formed on a surface of the core particle 2, the insulating passivation layer 3 having an inner layer 3*a* and an outermost layer 3*b* formed on the outside of the inner layer 3*a*, the outermost layer 3*b* containing iron oxide. Accordingly, the composite magnetic particle 1 is configured as a multilayer-coating particle in which the core particle 2 is coated with the insulating passivation layer 3 constituted by at least the inner layer 3*a* and the outermost layer 3*b*.

The core particle 2 is iron base powder (particles, powder) containing iron (which includes pure iron and iron containing inevitable impurities) as the main component. Specific examples of the core particle 2 include: those containing only iron; and a composition containing iron and a small amount of other elements (e.g., Si, P, Co, Ni, Cr, Al, Mo, Mn, Cu, Zn, B, V and Sn) added to the iron. Also, the core particle 2 may be, in addition to element metal and element metal with (an)other element(s) added thereto, alloys such as an Fe—Si based alloy, an Fe—Al based alloy, an Fe—N based alloy, an Fe—C based alloy, an Fe—B based alloy, an Fe—Co based alloy, an Fe—P based alloy, an Fe—Ni—Co based alloy, an Fe—Cr based alloy, an Fe—Al—Si based alloy, etc. One kind thereof may be used alone or two or more kinds may be used in combination.

Examples of a preferable core particle 2 include, but are not particularly limited to, those containing 99% by mass or more iron (pure iron). Soft magnetic particles containing 99% by mass or more of iron tend to have lower Vicker's hardness and superior compactibility as compared to the above Fe—Al—Si based alloy particles in the related art and iron-based particles with a purity of less than 99% by mass, and therefore the use of such soft magnetic particles allows for the achievement of even higher density and improvement of magnetic properties. In particular, a composition containing 0.5% by mass or less of P, 0.1% by mass or less of Mn, 0.03% by mass or less of Al, V, Cu, As or Mo, and the balance iron is more preferable. The core particle 2 may be a single body or may be an aggregate or a union of a plurality of members (core pieces).

The particle diameter of the core particle 2 is not particularly limited and may be appropriately set in accordance with the desired performance. Note that the particle diameter of the core particle 2 affects the density and magnetic permeability of a powder magnetic core to be formed, and a larger diameter of the core particle 2 tends to cause the soft magnetic particles to be deformed due to pressure during warm-compaction and tends to increase the density. Accordingly, an average diameter of about from 20 to 300 μm is preferable as the particle diameter of the core particle 2. Note that the average diameter herein refers to the particle diameter of D50%.

The core particle 2 may be manufactured by known methods, and the process thereof is not particularly limited. Soft magnetic particles having any composition and any particle diameter can be obtained using known processes such as, for example, an ore reduction process, a mechanical alloying process, a gas-atomization process, a water atomization process, a rotary atomization process and a cast-crushing process.

The core particle 2 preferably has a soft magnetic particle containing iron as the main component and an insulating layer formed on the soft magnetic particle. In such a case, the core particle 2 may be a particle having a core-shell structure having an insulating layer formed on the periphery of the soft magnetic particle containing iron as the main component. The insulating layer can provide the core particle 2 with a higher insulation property.

A material constituting the insulating layer of the core particle 2 is not particularly limited as long as it can provide an insulation property to the surface of the core particle 2, examples of which may include iron phosphate, iron borate, iron sulfate, iron nitrate, iron acetate, iron carbonate, silica, titania, zirconia, magnesia, alumina, chromium oxide and zinc oxide, where one kind thereof may be used alone or two or more kinds thereof may be used in combination. In terms of heat resistance, the insulating layer may preferably be iron phosphate, silica, titania, zirconia, magnesia, alumina, chromium oxide, zinc oxide, etc., and more preferably, iron phosphate.

The thickness of the insulating layer of the core particle 2 is not particularly limited, but is preferably about from 5 to 500 nm. With the thickness within this range, required insulation property and high magnetic permeability tend to be easily ensured.

The inner layer 3*a* and the outermost layer 3*b* are formed as the insulating passivation layer 3 on the periphery of the core particle 2, and the outermost layer 3*b* contains iron oxide as the main component. The "iron oxide" referred to herein encompasses FeO, $Fe_2O_3$ and $Fe_3O_4$. The expression "as the main component" referred to herein indicates the content of 50% by mass or higher based on the total weight of the outermost layer.

The inner layer 3*a* may be constituted by a single member or a plurality of members. In terms of suppression of variations in physical properties of the powder magnetic core, it is preferable that the inner layer 3*a* is formed uniformly on the periphery of the core particle 2.

Components constituting the inner layer 3*a* are not particularly limited, examples of which may include various kinds of known metals and the oxides thereof. However, the inner layer 3*a* preferably contains the iron oxide and at least one kind of an oxide of nonferrous metal. With the configuration in which the iron oxide is contained not only in the outermost layer 3*b* but also in the inner layer 3*a*, magnetic properties such as magnetic permeability tend to be further increased. In addition, with the configuration in which iron is contained as a common metal in the insulating passivation layer 3, adhesiveness between the layers (the inner layer 3*a* and the outermost layer 3*b*) tends to increase, and thus more uniform coating can be achieved. Furthermore, with the configuration in which the oxide of nonferrous metal is contained, the electrical resistance of the insulating passivation layer can be further enhanced.

Although the nonferrous metal is not particularly limited as long as it is metal other than Fe, it is preferable to contain metal capable of forming metal oxide having an excellent heat resistance, e.g., at least one kind selected from the group consisting of Al, Zr, Si, Ti, Mg, Cr, Mn, Na, Li, Zn, Ba and Ce, and in terms of heat resistance, it is more preferable to contain at least one kind selected from the group consisting of Al, Zr, Si, Ti and Mg.

The content of nonferrous metal in the inner layer 3*a* is not particularly limited, but the content of nonferrous metal in the inner layer 3*a* is preferably from 5 to 80 at. %, more preferably from 5 to 60 at. %, and even more preferably from 10 to 40 at. %, based on an element content analysis by TEM-EDS analysis excluding C and O. By setting the content to 5 at. % or higher, the heat resistance and insulation property tend to be further improved, while by setting the content to 80 at % or lower, the adhesiveness and magnetic permeability of the coatings tend to be further improved.

The components constituting the inner layer 3*a* may include carbon, nitrogen, fluorine, other residues, etc. in addition to those listed above. However, the content of carbon, nitrogen, fluorine and other residues is preferably low in order to improve magnetic properties. These components may be produced as a result of a heat treatment performed on the later-described soft magnetic material or may exist in the form of oxides, etc.

The thickness of the inner layer 3*a* is not particularly limited; however, in general, the thickness is preferably from 50 nm to 1.0 μm. By setting the thickness of the inner layer 3*a* to 50 nm or more, the electrical resistivity of the resulting powder magnetic core tends to be enhanced, while by setting the thickness of the inner layer 3*a* to 1.0 μm or lower, magnetic properties such as the density of magnetic flux and magnetic permeability tend to be enhanced.

As the insulating passivation layer 3 coating the core particle 2, the outermost layer 3*b* is further formed on the periphery of the inner layer 3*a*. The outermost layer 3*b* may be formed at least on a part of the periphery of the inner layer 3*a*. Accordingly, the outermost layer 3*b* may be formed so as to cover the entire periphery of the inner layer 3*a* or may be partially formed on the periphery of the inner layer 3*a*.

In the components constituting the outermost layer 3*b*, the content of Fe element in the outermost layer 3*b* is preferably 50 at. % or more, and more preferably 70 at. % or more, based on an element content analysis by TEM-EDS analysis excluding C and O. With a large amount of iron oxide contained as the main component, the adhesiveness between the layers in the insulating passivation layer 3 and performance to fill gaps of the layers in the insulating passivation layers 3 tend to be further improved, and the density of magnetic flux can be further enhanced. In the related art, core particles are coated using silane coupling agents or silicone resins. Although such a technique can enhance the electrical resistivity to a certain degree, it has a problem in that the density of magnetic flux is greatly lowered. On the other hand, in the composite magnetic particle 1 of the present embodiment, since the outermost layer 3*b* of the insulating passivation layer 3 contains the iron oxide as the main component, the powder magnetic core having high electrical resistivity and high magnetic flux density can be achieved.

The components constituting the outermost layer 3*b* may further include carbon, nitrogen, fluorine, other residues, etc, in addition to the iron oxide. However, the content of carbon, nitrogen, fluorine and other residues is preferably low in order to improve magnetic properties. These components may be produced as a result of a heat treatment performed on the soft magnetic material as described below or may exist in the form of oxides, etc.

The thickness of the outermost layer 3*b* is not particularly limited; however, in general, the thickness is preferably from 10 nm to 500 nm. By setting the thickness of the outermost layer 3*b* to 10 nm or more, the adhesiveness between particles in the resulting powder magnetic core tends to be enhanced, while by setting the thickness of the outermost layer 3*b* to 500 nm or less, the density of magnetic flux and the density of compaction tend to be enhanced.

The composite magnetic particle 1 of the present embodiment may have a multilayer structure having at least two layers as the insulating passivation layer 3, where, for example, the inner layer 3*b* may be constituted by a plurality of layers. If the inner layer 3*b* is constituted by a plurality of layers, each of those layers may employ the components described above as the components of the inner layer 3*b*.

Manufacturing methods for the powder magnetic core of the present embodiment are not particularly limited, and known methods may be employed. For example, the powder magnetic core containing the above-described composite magnetic particle 1 can be fabricated by performing warm-compaction on the mixture containing raw powder (soft magnetic material) and a lubricant and performing a heat treatment on the resulting compact. A preferable example of the methods for manufacturing the power magnetic core will be described in detail below.

Raw powder (soft magnetic material) includes, for example, a core particle containing iron as the main component and a coating layer formed on the core particle, and examples of available raw powder (soft magnetic material) include: raw powder (soft magnetic material) including coating layers formed by coating a metal complex or a metal alkoxide and further coating an iron complex thereon; raw powder (soft magnetic material) including coating layers formed by coating the mixture of an iron complex and a metal alkoxide and further coating an iron complex thereon; and raw powder (soft magnetic material) including coating layers formed by coating two or more kinds of nonferrous metal complexes and further coating an iron complex thereon. By using raw powders (soft magnetic material) having such coating layers, the powder magnetic core of the present embodiment can be manufactured easily.

The metal complex or metal alkoxide contained in the coating layer of the raw powder (soft magnetic material) may employ metal kinds corresponding to metals contained in the insulating passivation layer of the powder magnetic core and may appropriately be selected in consideration of a desired component composition of the powder magnetic core.

Alkoxide groups in the metal alkoxide contained in the coating layer of the raw powder (soft magnetic material) are preferably of kinds having small carbon numbers, and examples of available alkoxide groups include a methoxy group, an ethoxy group, a propoxy group, a butoxy group, a pentoxy group and a hexoxy group.

Specific examples of the metal alkoxide include, but are not particularly limited to, aluminum ethoxide, aluminum isopropoxide, aluminum butoxide, zirconium butoxide, zirconium tetra-normal-propoxide, titanium tetra-propoxide, tetramethoxysilane, tetraethoxysilane, hexyltrimethylsilane, trimethoxymethylsilane, triethoxymethylsilane, hexyltrimethoxysilane, where one kind thereof may be used alone or two or more kinds thereof may be used in combination.

An organic ligand of the metal complex contained in the coating layer of the raw powder (soft magnetic material) may employ a ligand constituted by C, H, O, F, etc. By using the coating layer containing such an organic ligand, the coating layer having excellent heat resistance and coating formability can be formed. In addition, in the heat treatment step described below, reaction of metal such as iron contained in the raw powder (soft magnetic material) can be effectively promoted between the layers. As a result, coatings having high adhesiveness, large thickness and high uniformity can be efficiently formed.

The metal complex may be typically selected from those having the coordination number about of 1 to 24, in accordance with the oxidation number of the central metal above, and the coordination number is preferably from 2 to 12, and more preferably from 2 to 8. When the metal complex has a plurality of organic ligands, the organic ligands may be the same as or different from each other. Examples of preferable organic ligands include, but are not particularly limited to, multidentate ligand such as acetylacetonate, ethyl acetoacetate, trifluoroacetylacetonate, and hexafluoroacetylacetonate, where acetylacetonate is more preferable.

A preferable metal complex contained in the coating layer of the raw powder (soft magnetic material) may be a metal chelate complex having a central metal and at least one chelate ligand. By using a metal chelate complex that is stable due to the chelating effect, a coating layer having excellent heat resistance and coating formability can be formed. Another preferable metal complex may be a metal chelate complex having a central metal and a plurality of chelate ligands.

Specific examples of the metal complex include, but are not particularly limited to, zirconium tetraacetylacetonate, zirconium tributoxyacetylacetonate, zirconium acetylacetonate bis(ethylacetoacetate), aluminum ethylacetoacetate diisopropylate, aluminum trisethyl acetoacetate, aluminum bisethyl acetoacetate monoacetylacetonate, aluminum acetylacetonate, magnesium acetylacetonate, magnesium bis-trifluomacetylacetonate, magnesium hexafluoroacetylacetonate, manganese acetylacetonate, cobalt acetylacetonate, chromium acetylacetonate, titanium acetylacetonate, titanium oxyacetylacetonate, iron acetylacetonate, and tris(hexafluoroacetylacetonato)iron(III). One kind of these metal complexes may be used alone or two or more kinds thereof may be used in combination.

The structure of the coating layer of the raw power (soft magnetic material) may be selected in consideration of the structure of the insulating passivation layer of the composite magnetic particle to be obtained. For example, if the insulating passivation layer of the composite magnetic particle has a two-layer structure constituted by an inner layer (one layer) and the outermost layer, the coating layer of the raw powder (soft magnetic material) may employ a two-layer structure constituted by a first layer and a second layer.

Figure 2:
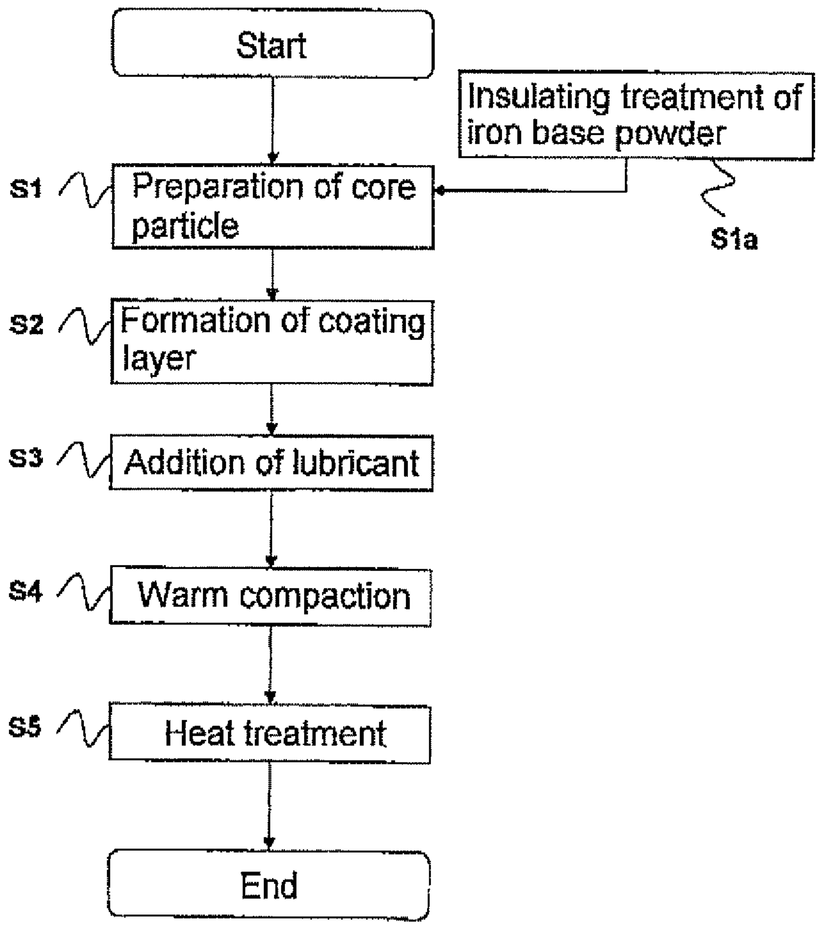
FIG. 2 is a flowchart showing an example of a procedure for manufacturing the powder magnetic core of the present embodiment.

FIG. 2 is a flowchart showing an example of a procedure for manufacturing the powder magnetic core of the present embodiment. Here, the above-described raw powder (soft magnetic material) is prepared through the step of preparing a core particle (S1) and the step of forming a first layer by applying a metal complex or a metal alkoxide to the core particle and further applying an iron complex to the outermost layer to form coating layers having two or more layers (S2). Then the powder magnetic core containing the above-described composite magnetic particle 1 is fabricated through the step of adding a lubricant to the above-described raw powder (soft magnetic material) (S3), the step of warm-compacting the resulting mixture (S4) and the step of performing a heat t treatment on the compact obtained after the heat compaction (S5).

In the step of preparing the core particle (S1), the core particle is obtained by performing, as needed, an insulating treatment on the surface of a soft magnetic particle, i.e., iron base powder to form an insulating layer (S1*a*). The insulating treatment method for the soft magnetic particle is not particularly limited as long as the method cart form an insulating layer having a composition whose examples are described above. Known methods may be appropriately employed; for example, the iron base powder is treated with an aqueous solution containing phosphoric acid and/or phosphate (e.g., an aqueous solution containing 80-90% orthophosphoric acid ($H_3PO_4$)) and then dried. Note that step S1*a* above can be omitted by purchasing a commercially-available core particle product in which an insulating layer is formed on a soft magnetic particle, i.e., iron base powder.

In the step of forming the coating layer (S2), in the case where the first layer is formed by applying the metal complex or metal alkoxide to the core particle and the iron complex is further applied to the outermost layer to form the coating layers having two or more layers, it is preferable to form the first layer by applying the mixture of an iron complex and a nonferrous metal complex or a nonferrous metal alkoxide, and it is more preferable that the atomic weight of iron is larger than the atomic weight of nonferrous central metal in the nonferrous metal complex or nonferrous metal alkoxide. It is also possible to form, as needed, further layers such as a third layer and a fourth layer by further applying a metal alkoxide to the inner layer or to form a plurality of layers containing nonferrous metal and having different concentration distributions in the thickness direction of the layers by repeatedly applying the metal complex. In this way, the above-described raw powder (soft magnetic material) can be obtained. The method for applying the metal complex is not particularly limited and known methods can be appropriately employed, such as a method in which an application liquid with a metal complex dispersed or dissolved in a solvent is applied to the core particle and then dried.

When the metal complex is applied, a mixing process may be performed as needed using a kneader, a mixer, a stirrer, a granulator, a disperser, or the like. In addition, in terms of improvements in the uniformity and adhesiveness of the coating layer, it is preferable to employ a spray process in which an application liquid with the metal complex dispersed or dissolved in a solvent is sprayed and applied onto the core particle using a spray gun or the like. Examples of the solvent available in the spray process include, but are not particularly limited to, organic solvents such as methylethylketone, toluene, acetone and alcohol.

In the step of adding a lubricant to the raw powder (soft magnetic material) (S3), the lubricant is added to the raw powder (soft magnetic material). Although the lubricant may be appropriately selected from known lubricants in this field without any particular limitation, a metal soap is preferably used. The lubricant improves the fluidity of the raw powder (soft magnetic material) during the warm-compaction and promotes deformation in the raw powder (soft magnetic material) when a pressure is applied, and the lubricant can also serve as an insulating layer provided between the core particles and as a protection layer provided between the core particles. Such a metal soap allows for the formation of a uniform coating on the periphery of the raw powder (soft magnetic material) easily during the warm-compaction and has excellent insulation property, and therefore the metal soap is particularly suitable for use as the lubricant used in the above manufacturing method. Specific examples of the metal soap include zinc oleate, zinc stearate, aluminum stearate, calcium stearate, lithium stearate and cesium stearate, where one kind thereof may be used alone or two or more kinds thereof may be used in combination.

The loading of the lubricant is not particularly limited, but is preferably from 0.02 to 0.5 t % by mass, and more preferably from 0.05 to 0.2% by mass, based on the total mass of the raw powder (soft magnetic material) and the lubricant. By setting the loading of the lubricant to 0.02% by mass or more, the lubricant tends to be easily distributed uniformly over the periphery of the raw powder (soft magnetic material). On the other hand, by setting the loading of the lubricant to 0.5% by mass or less, the amount of lubricant relative to the raw powder (soft magnetic material) becomes appropriate, and thus the effect of adding the lubricant can be obtained sufficiently. Furthermore, the content of the soft magnetic material is not reduced and it becomes easy to achieve high density and high magnetic permeability.

In the step of adding the lubricant to the raw powder (soft magnetic material) (S3), in order to distribute the added lubricant uniformly in the raw powder (soft magnetic material), it is preferable to blend the mixture. Although the blending may be carried out by known methods without any particular limitation. The blending is preferably carried out by a mixer (e.g., a flash blender, a rocking shaker, a drum shaker, a V blender, etc.) or a granulator (e.g., a fluid-bed granulator, a tumbling granulator, etc.).

In the step of warm-compaction (S4), the mixture obtained as described above, i.e., the mixture containing at least the raw powder (soft magnetic particle) and the lubricant, are formed into an arbitrary shape while being subjected to the application of heat and pressure. Although this warm-compaction may be carried out by known methods without any particular limitation, the warm-compaction is preferably carried out using a compaction mold having a cavity of a desired shape, where the cavity is filled with the mixture, and the mixture is compressed and compacted under a predetermined compaction temperature and a predetermined compaction pressure.

The compaction temperature in the warm-compaction is not particularly limited, but it is generally from 80° C. to 200° C., and preferably from 100° C. to 160° C. Note that, although the density of the compact tends to increase in accordance with the increase in the compaction temperature in the warm-compaction, a temperature of 200° C. or lower tends to appropriately suppress the oxidation of the core particle (soft magnetic particle) and to suppress degradation in the performance of the resulting powder magnetic core, and also shows good productivity and cost efficiency.

The compaction pressure in the warm-compaction is not particularly limited, but is generally from 600 to 1200 MPa. By setting the compaction pressure in the warm-compaction to 600 MPa or higher, it tends to be easy to achieve high density and high magnetic permeability by the warm-compaction. On the other hand, by setting the compaction pressure in the warm-compaction to 1200 MPa or lower, it tends to be possible to suppress the saturation of the effect of applying pressure, tends to achieve good productivity and cost efficiency; and tends to suppress the deterioration of the molding die and improve the durability thereof.

In the step of performing a heat treatment on the compact obtained after the warm-compaction (S5), a compression strain generated during the warm-compaction is released to increase the core resistance and reduce the core loss (in particular, the hysteresis loss). The heat treatment may be performed by known methods without any particularly limitation, but it is generally preferable to subject the compact, which has been compacted into an arbitrary shape by the warm-compaction, to a heat treatment at a predetermined temperature using an annealing furnace.

The temperature in the heat treatment is not particularly limited, but in general, it is preferably about from 450° C. to 600° C. By setting the treatment temperature in the heat treatment to 450° C. or higher, reactions in the insulating layer and the coating layer tend to be promoted appropriately, which tends to reduce the core resistance, while by setting the treatment temperature in the heat treatment to 600° C. or lower, the reactions in the Insulating layer and the coating layer tend to be suppressed appropriately, and thus the insulation property can be maintained and the core resistance tends to be increased.

The heat treatment step is preferably carried out under the oxygen-containing atmosphere. Here, the oxygen-containing atmosphere may include, but is not particularly limited to, the air atmosphere (in general, containing 20.95% oxygen) or the mixed atmosphere of oxygen and an inert gas such as argon and nitrogen. By performing the heat treatment under the oxygen-containing atmosphere, the decomposition, oxidation, etc. of the metal alkoxide or metal complex in the coating layer are promoted to produce oxides, which can significantly increase the core resistance and significantly reduce the core loss.

The powder magnetic core obtained as described above surprisingly contains the above-described composite magnetic particle and contains iron oxide in the outermost layer 3*b* of the insulating passivation layer 3. Since the powder magnetic core obtained as described above contains such a composite magnetic particle 1, it has high density and exhibits excellent performance such as high permeability, high strength, high resistance and low core loss. Note that the powder magnetic core having a desired component composition can be obtained by appropriately selecting the component composition and the layer structure of the above-described raw powder (soft magnetic material).

EXAMPLES

The present invention will be described below in more detail by means of Examples, but the present invention is not limited thereto.

Production Method

Example 1

First, as a core particle having: a soft magnetic particle containing iron as the main component; and an insulating layer formed on the surface of the soft magnetic particle, pure iron coated with an insulating layer (trade name "Somaloy 700" manufactured by Höganäs A B; the average particle diameter: 200 μm) was prepared. Next, solutions obtained by dissolving aluminum isopropoxide and zirconium tetra-normal-propoxide in toluene and a solution obtained by dissolving iron(III) acetylacetonate in toluene were prepared. Then the Al alkoxide solution and the Zr alkoxide solution were applied to the pure iron coated with the insulating layer in the ratios of Al atomic weight of 0.0035 mol % and Zr atomic weight of 0.0035 mol %, respectively, with respect to the Fe atomic weight contained in the soft magnetic particle, and then dried by heating. Then the Fe complex solution was further applied in the ratio of Fe atomic weight of 0.01 mol % with respect to the Fe atomic weight contained in the soft magnetic particle, and then dried by heating to obtain raw powder (soft magnetic material).

Then 0.1% by mass zinc stearate was added as a lubricant to the raw powder (soft magnetic material), and the resulting mixture was placed in a mixer (trade name "V-blender" manufactured by TSUTSUI SCIENTIFIC INSTRUMENTS CO., LTD.) and blended with the revolution speed of 12 rpm for 10 minutes. The blended mixture (blended product) was then subjected to warm-compaction under the condition where the compaction temperature was 130° C. and the compaction pressure was 081 MPa, thereby forming a toroidal core (compact) having the size of 17.5 mm (outer diameter)×10 mm (inner diameter)×4 mm (thickness). Then a heat treatment at 550° C. under the switched atmospheres of nitrogen and the air to obtain a powder magnetic core.

Figure 3:
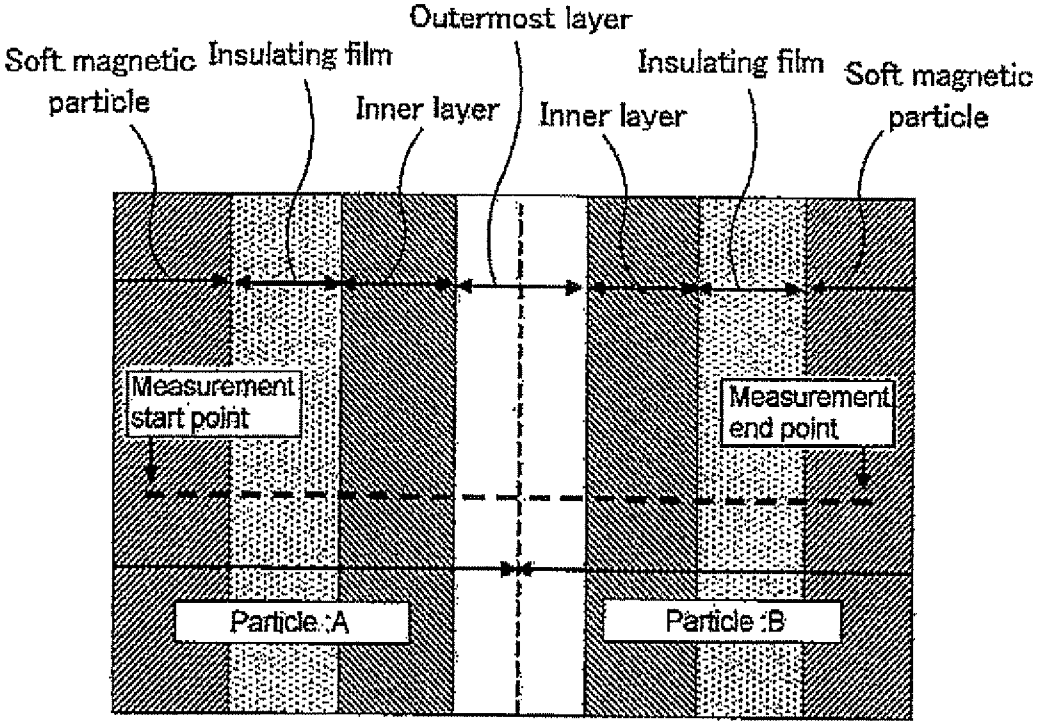
FIG. 3 is a schematic diagram showing measurement points in TEM measurement.
Figure 4:
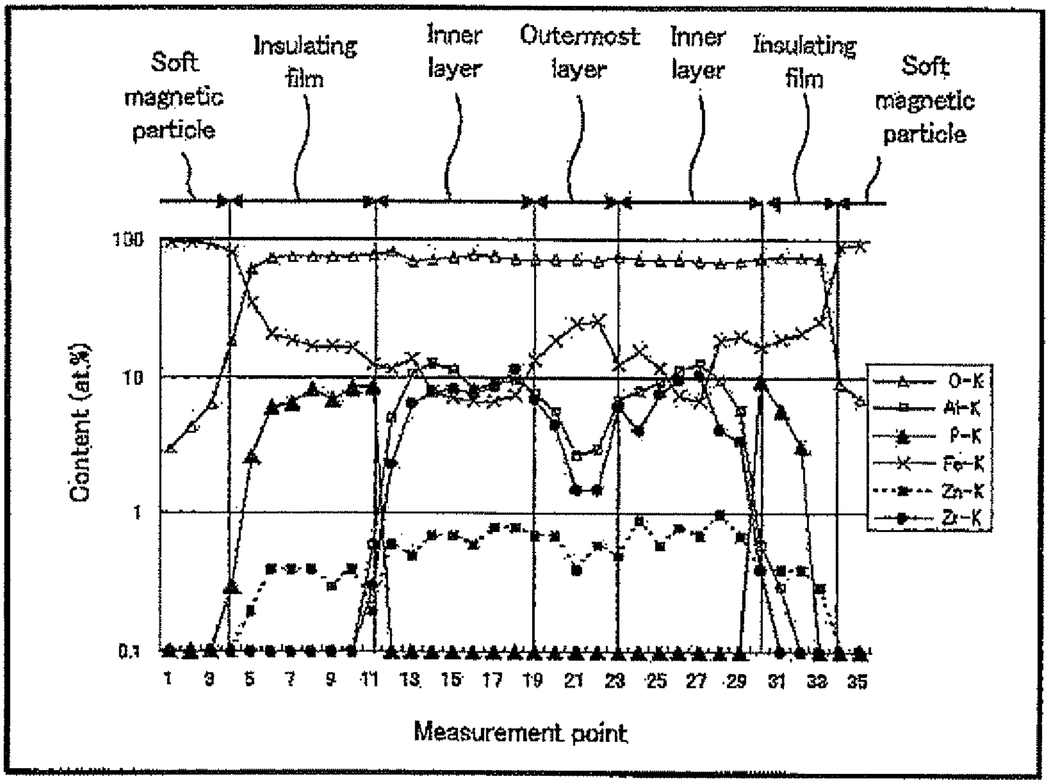
FIG. 4 is a graph showing a component composition of a powder magnetic core of Example 1.

The structure of the resulting powder magnetic core was checked by TEM observation. In this TEM observation, an observation sample was prepared by a micro-sampling method using Dual-BeamFIB (Nova 200). After preparing the sample, a composition analysis was performed by an EDS (Electron Dispersive x-ray Spectroscopy) using HD 2000 manufactured by Hitachi Ltd, at an acceleration voltage of 200 kV under the following conditions—beam diameter: 1 nm, objective lens aperture diameter: 40 μm, and measurement points: about 30 to 35 points at regular intervals on the interface between particles. FIG. 3 is a schematic diagram showing measurement points in the TEM measurement. As shown in FIG. 3, the measurement points were measured sequentially from the inside of a given particle A to the inside of an adjacent particle B of the powder magnetic core, and the component composition thereof was analyzed. FIG. 4 is a graph showing the component composition of the powder magnetic core in Example 1. As shown in FIG. 4, it has been verified that the powder magnetic core in Example 1 included a core particle containing iron as the main component and insulating passivation layer, and the insulating passivation layer had a two-layer structure constituted by an inner layer containing iron oxide and oxide of nonferrous metal and the outermost layer containing iron oxide as the main component, and the core particle was coated with a phosphoric acid coating.

Example 2

First, as a core particle having: a soft magnetic particle containing iron as the main component; and an insulating layer formed on the surface of the soft magnetic particle, pure iron coated with an insulating layer (trade name "Somaloy 700" manufactured by Höganäs A B; the average particle diameter: 200 μm) was prepared. Next, a solution obtained by dissolving aluminum isopropoxide in toluene and a solution obtained by dissolving iron(III) acetylacetonate in toluene were prepared. Then the Al alkoxide solution and the Fe complex solution were applied to the pure iron coated with the insulating layer in the ratios of Al atomic weight of 0.0035 mol % and Fe atomic weight of 0.02 mol %, respectively, with respect to the Fe atomic weight contained in the soft magnetic particle, and then dried by healing. Then the Fe complex solution was further applied in the ratio of Fe atomic weight of 0.01 mol % with respect to the Fe atomic weight contained in the soft magnetic particle and then dried by heating to obtain raw powder (soft magnetic material).

Then 0.1% by mass zinc stearate was added as a lubricant to the raw powder (soft magnetic material), and the resulting mixture was placed in a mixer (trade name "V-blender" manufactured by TSUTSUI SCIENTIFIC INSTRUMENTS CO., LTD.) and blended with the revolution speed of 12 rpm for 10 minutes. The blended mixture (blended product) was then subjected to warm-compaction under the condition where the compaction temperature was 130° C. and the compaction pressure was 981 MPa, thereby forming a toroidal core (compact) having the size of 17.5 mm (outer diameter)×10 mm (inner diameter)×4 mm (thickness). Then a heat treatment was performed at 550° C. under the switched atmospheres of nitrogen and the air to obtain a powder magnetic core.

Example 3

First, as a core particle having: a soft magnetic particle containing iron as the main component; and an insulating layer formed on the surface of the soft magnetic particle, pure iron coated with an insulating layer (trade name "Somaloy 700" manufactured by Höganäs A B; the average particle diameter; 200 μm) was prepared. Next, solutions obtained by dissolving aluminum isopropoxide and zirconium tetra-normal-propoxide in toluene and a solution obtained by dissolving iron(III) acetylacetonate in toluene were prepared. Then the Al alkoxide solution, the Zr alkoxide solution and the Fe complex solution were applied to the pure iron coated with the insulating layer in the ratios of Al atomic weight of 0.0035 mol %, Zr atomic weight of 0.0035 mol %, and Fe atomic weight of 0.02 mol %, respectively, with respect to the Fe atomic weight contained in the soft magnetic particle, and then dried by heating. Then the Fe complex solution was further applied in the ratio of the Fe atomic weight of 0.01 mol % with respect to the Fe atomic weight contained in the soft magnetic particle and then dried by heating to obtain raw powder (soft magnetic material).

Then 0.1% by mass zinc stearate was added as a lubricant to the raw powder (soft magnetic material), and the resulting mixture was placed in a mixer (trade name "V-blender" manufactured by TSUTSUI SCIENTIFIC INSTRUMENTS CO., LTD.) and blended with the revolution speed of 12 rpm for 10 minutes. The blended mixture (blended product) was then subjected to warm-compaction under the condition where the compaction temperature was 130° C. and the compaction pressure was 981 MPa, thereby forming a toroidal core (compact) having the size of 17.5 mm (outer diameter)×10 mm (inner diameter)×4 mm (thickness). Then a heat treatment was performed at 550° C. under the switched atmospheres of nitrogen and the air to obtain a powder magnetic core.

Figure 5:
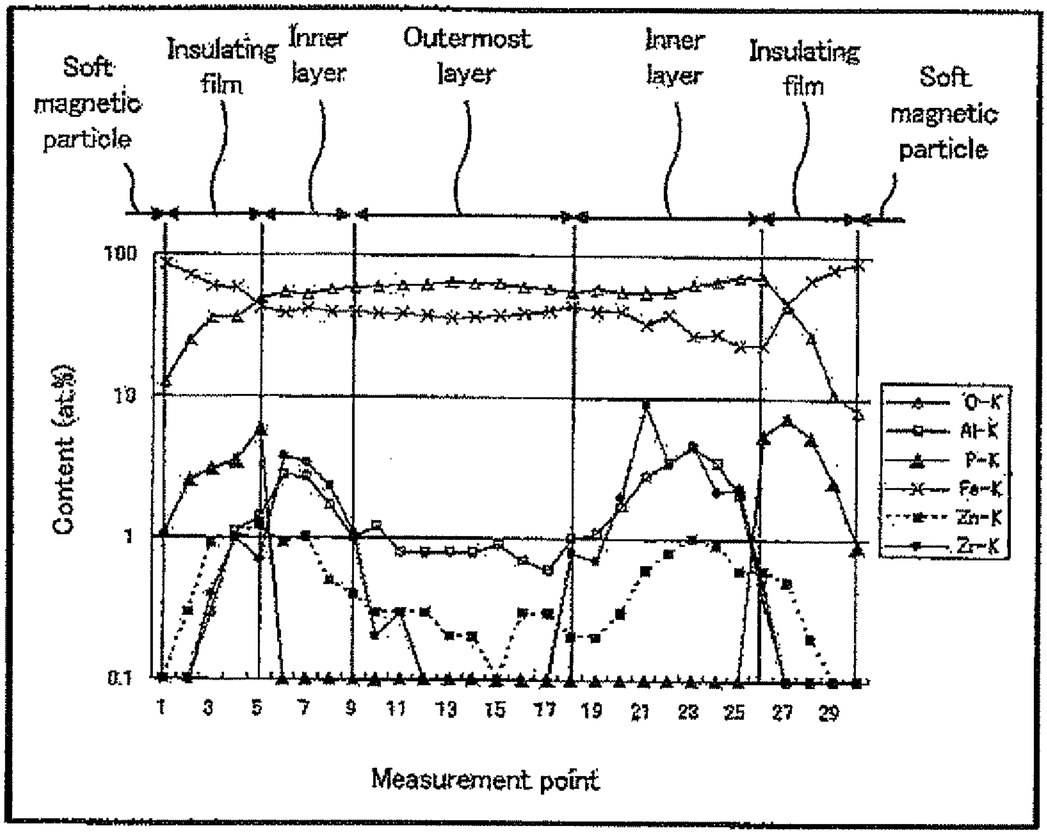
FIG. 5 is a graph showing a component composition of a powder magnetic core of Example 3.

The structure of the resulting powder magnetic core was checked by TEM observation. FIG. 5 is a graph showing the component composition of the resulting powder magnetic core. As shown in FIG. 5, it has been verified that the powder magnetic core of Example 3 included the core particle containing iron as the main component and the insulating passivation layer, and the insulating passivation layer had a two-layer structure constituted by an inner layer containing iron oxide and oxide of nonferrous metal and the outermost layer containing a large amount of iron oxide as the main component, and the core particle was coated with a phosphoric acid coating.

Example 4

First, as a core particle having: a soft magnetic particle containing iron as the main component; and an insulating layer formed on the surface of the soft magnetic particle, pure iron coated with an insulating layer (trade name "Somaloy 700" manufactured by Höganäs A B; the average particle diameter: 200 μm) was prepared. Next, a solution obtained by dissolving aluminum acetylacetonate in toluene, a solution obtained by dissolving zirconium acetylacetonate in toluene and a solution obtained by dissolving iron(III) acetylacetonate in toluene were prepared. Then the Al complex solution was applied to the pure iron coated with the insulating layer in the ratio of Al atomic weight of 0.01 mol % with respect to the Fe atomic weight contained in the soft magnetic particle, and then dried by heating. Then the Zr complex solution was further applied in the ratio of the Zr atomic weight of 0.02 mol % with respect to the Fe atomic weight contained in the soft magnetic particle and then dried by heating. Then the Fe complex solution was further applied in the ratio of the Fe atomic weight of 0.01 mol % with respect to the Fe atomic weight contained in the soft magnetic particle and then dried by heating to obtain raw powder (soft magnetic material).

Then 0.1% by mass zinc stearate was added as a lubricant to the raw powder (soft magnetic material), and the resulting mixture was placed in a mixer (trade name "V-blender" manufactured by TSUTSUI SCIENTIFIC INSTRUMENTS CO., LTD.) and blended with the revolution speed of 12 rpm for 10 minutes. The blended mixture (blended product) was then subjected to warm-compaction under the condition where the compaction temperature was 130° C. and the compaction pressure was 981 MPa, thereby forming a toroidal core (compact) having the size of 17.5 mm (outer diameter)×10 mm (inner diameter)×4 mm (thickness). Then a heat treatment was performed at 550° C. under the switched atmospheres of nitrogen and the air to obtain a powder magnetic core.

Example 5

First, as a core particle having: a soft magnetic particle containing iron as the main component; and an insulating layer formed on the surface of the soft magnetic particle, pure iron coated with an insulating layer (trade name "Somaloy 700" manufactured by Höganäs A B; the average particle diameter: 200 μm) was prepared. Next, a solution obtained by dissolving aluminum acetylacetonate in toluene, a solution obtained by dissolving zirconium acetylacetonate in toluene and a solution obtained by dissolving iron(III) acetylacetonate in toluene were prepared. Then the Al complex solution was applied to the pure iron coated with the insulating layer in the ratio of Al atomic weight of 0.01 mol % with respect to the Fe atomic weight contained in the soft magnetic particle, and then dried by heating. Then the Zr complex solution was further applied in the ratio of the Zr atomic weight of 0.02 mol % with respect to the Fe atomic weight contained in the soft magnetic particle and then dried by heating. Then the Fe complex solution was further applied in the ratio of the Fe atomic weight of 0.01 mol % with respect to the Fe atomic weight contained in the soft magnetic particle and then dried by heating to obtain raw powder (soft magnetic material).

Then 0.1% by mass lithium stearate was added as a lubricant to the raw powder (soft magnetic material), and the resulting mixture was placed in a mixer (trade name "V-blender" manufactured by TSUTSUI SCIENTIFIC INSTRUMENTS CO., LTD.) and blended with the revolution speed of 12 rpm for 10 minutes. The blended mixture (blended product) was then subjected to warm-compaction under the condition where the compaction temperature was 130° C. and the compaction pressure was 981 MPa, thereby forming a toroidal core having the size of 17.5 mm (outer diameter)×10 mm (inner diameter)×4 mm (thickness). Then a heat treatment was performed at 550° C. under the switched atmospheres of nitrogen and the air to obtain a powder magnetic core.

Comparative Example 1

First, as a core particle having: a soft magnetic particle containing iron as the main component; and an insulating layer formed on the surface of the soft magnetic particle, pure iron coated with an insulating layer (trade name "Somaloy 700" manufactured by Höganäs A B; the average particle diameter: 200 μm) was prepared. Next, an Al alkoxide solution obtained by dissolving aluminum isopropoxide in toluene was prepared. Then the Al alkoxide solution was applied to the pure iron coated with the insulating layer in the ratio of Al atomic weight of 0.1 mol % with respect to the Fe atomic weight contained in the soft magnetic particle, and then dried by heating to form one coating layer and obtain raw powder (soft magnetic material).

Then 0.1% by mass zinc stearate was added as a lubricant to the raw powder (soft magnetic material), and the resulting mixture was placed in a mixer (trade name "V-blender" manufactured by TSUTSUI SCIENTIFIC INSTRUMENTS CO., LTD.) and blended with the revolution speed of 12 rpm for 10 minutes. The blended mixture (blended product) was then subjected to warm-compaction under the condition where the compaction temperature was 130° C. and the compaction pressure was 981 MPa, thereby forming a toroidal core having the size of 17.5 mm (outer diameter)×10 mm (inner diameter)×4 mm (thickness). Then a heat treatment was performed at 550° C. under the switched atmospheres of nitrogen and the air to obtain a powder magnetic core having one insulating passivation layer.

Comparative Example 2

First, as a core particle having: a soft magnetic particle containing iron as the main component; and an insulating layer formed on the surface of the soft magnetic particle, pure iron coated with an insulating layer (trade name "Somaloy 700" manufactured by Höganäs A B; the average particle diameter: 200 μm) was prepared. Next, an Al alkoxide solution obtained by dissolving aluminum isopropoxide in toluene and a Zr alkoxide solution obtained by dissolving zirconium tetra-normal-propoxide in toluene were prepared. Then the Al alkoxide solution and the Zr alkoxide solution were applied to the pure iron coated with the insulating layer in the ratios of Al atomic weight of 0.075 mol % and Zr atomic weight of 0.075 mol %, respectively, with respect to the Fe atomic weight contained in the soft magnetic particle, and then dried by heating to obtain raw powder (soft magnetic material).

Then 0.1% by mass zinc stearate was added as a lubricant to the raw powder (soft magnetic material), and the resulting mixture was placed in a mixer (trade name "V-blender" manufactured by TSUTSUI SCIENTIFIC INSTRUMENTS CO., LTD.) and blended with the revolution speed of 12 rpm for 10 minutes. The blended mixture (blended product) was then subjected to warm-compaction under the condition where the compaction temperature was 130° C. and the compaction pressure was 981 MPa, thereby forming a toroidal core (compact) having the size of 17.5 mm (outer diameter)×10 mm (inner diameter)×4 mm (thickness). Then a heat treatment was performed at 550° C. under the switched atmospheres of nitrogen and the air to obtain a powder magnetic core.

Figure 6:
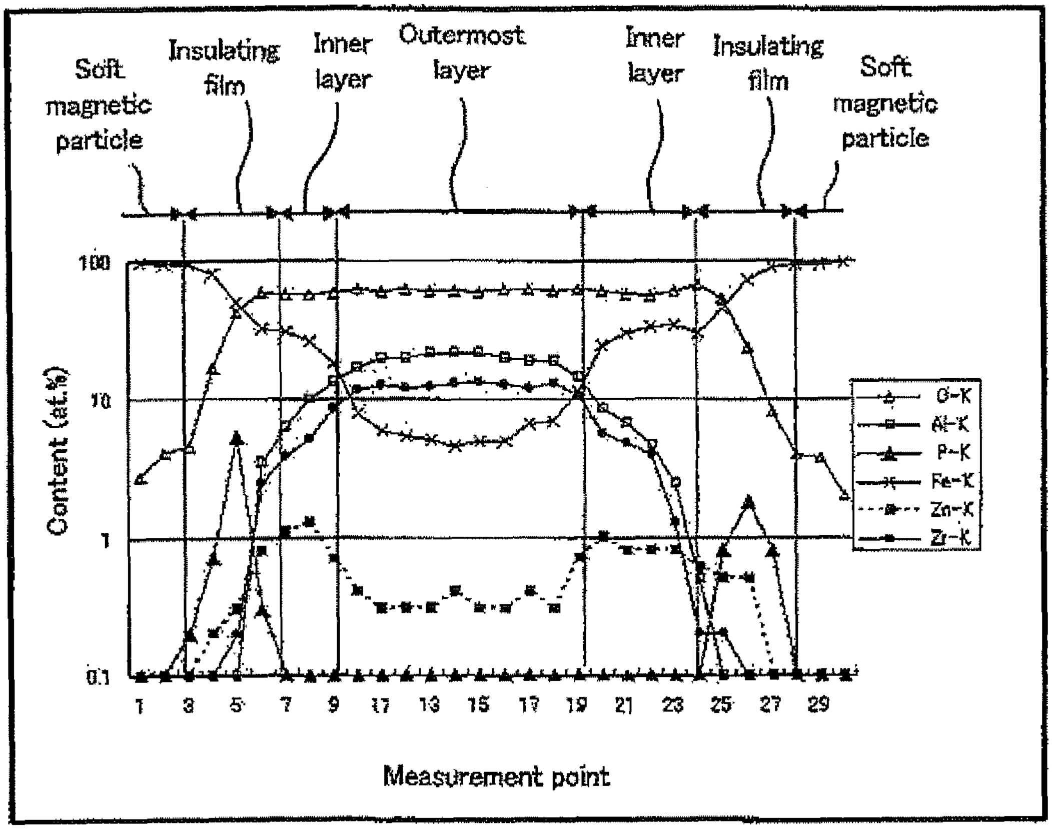
FIG. 6 is a graph showing a component composition of a powder magnetic core of Comparative Example 2.

The structure of the resulting powder magnetic core was checked by TEM observation. FIG. 6 is a graph showing the component composition of the resulting powder magnetic core. As shown in FIG. 6, it has been verified that, in the powder magnetic core of Comparative Example 2, the content of Fe element in the outermost layer of the insulating passivation layer is less than the content of Zr element and the content of Al element, and the outermost layer contained almost no iron oxide.

<Evaluation Method>

As an evaluation for magnetic properties, iron loss and magnetic permeability were measured at 1 kHz, 1 T using a BH analyzer (SY-8258 manufactured by IWATSU TEST INSTRUMENTS CORPORATION). Also, a wire was wound around the powder magnetic cores (primary wire: 50 ts, secondary wire; 10 ts), and a hysteresis curve in a direct-current magnetic field was measured by a direct-current magnetization characteristics tester (SK110 manufactured by METRON, Inc.) to obtain a value of magnetic flux density at the magnetic field of 8000 A/m. A radial crushing strength was evaluated by measuring the strength of the toroidal core using a transverse rupture strength tester (1311D manufactured by AIKOH ENGINEERING CO., LTD.). For evaluating electrical resistivity, both end surfaces of the toroidal core were polished and an In—Ga paste was applied thereto to form terminal electrodes, and a resistance value between the terminals was measured using MODEL 3569 or MODEL 3568 manufactured by TSURUGA ELECTRIC CORPORATION, and then the resistance value was converted to electrical resistivity of a rod-shaped sample based on the following equation:

$$\text{Electrical resistivity}=(20.343\times\text{actual measurement})+4.418.92.$$

Table 1 shows the measurement results of each Example and each Comparative Example.

| | Iron loss (@1 kHz, 1 T) | μ (@1 kHz, 1 T) | ρ (mΩ) | ρ (Ω · cm) | Magnetic flux density (mT) (@8000 A/m) | Density (g/cm³) |
|---|---|---|---|---|---|---|
| Ex. 1 | 101 | 624 | 265 | 0.006 | 1683 | 7.673 |
| Ex. 2 | 99 | 645 | 457 | 0.010 | 1679 | 7.662 |
| Ex. 3 | 94 | 684 | 542 | 0.011 | 1702 | 7.684 |
| Ex. 4 | 92 | 600 | 1284 | 0.027 | 1704 | 7.654 |
| Ex. 5 | 89 | 603 | 1539 | 0.032 | 1688 | 7.651 |
| Comp. Ex. 1 | 128 | 629 | 28 | 0.001 | 1693 | 7.656 |
| Comp. Ex. 2 | 103 | 502 | 259 | 0.006 | 1642 | 7.649 |

As shown in Table 1, the powder magnetic cores of Examples 1 to 5, which contain iron oxide in the outermost layer of the insulating passivation layer, were verified to have lower core loss and higher core resistance (resistance value and electrical resistivity), higher magnetic flux density and higher magnetic permeability as compared to the powder magnetic cores of Comparative Examples 1 and 2 which do not contain iron oxide in the outermost layer of the insulating passivation layer. Comparative Example 1 contained a small amount of oxide of nonferrous metal and thus showed high magnetic permeability and high magnetic flux density, however, it was verified that the core resistance (resistance value and electrical resistivity) was low and thus the core loss was high.

In Comparative Example 2 with increased kinds and content of nonferrous metals relative to Comparative Example 1, although the core resistance (resistance value and electrical resistivity) was improved due to the increase in the oxides of nonferrous metals, the magnetic properties such as magnetic permeability and magnetic flux density tended to be lowered since the thickness of a non-magnetic layer in the insulating passivation layer was thick. However, in each of the powder magnetic cores of Examples 1 to 5, even if the oxide of nonferrous metal was increased, since the outermost layer had a magnetic layer containing the iron oxide, the magnetic properties were improved and low core loss, high core resistance (resistance value and electrical resistivity), high magnetic flux density and high magnetic permeability were obtained.

In addition, in the powder magnetic cores of Examples 2 to 5 each containing Fe in the inner layer of the insulating passivation layer, since the adhesiveness, uniformity and magnetic properties in the insulating passivation layer were further enhanced due to the Fe atoms, the powder magnetic cores of Examples 2 to 5 were verified to have even lower core loss and even higher resistance (resistance value and electrical resistivity) and magnetic flux density. In particular, it was verified that Examples 1 to 3, which were each fabricated from a coating layer containing a metal alkoxide had high magnetic permeability, and Examples 4 and 5, which were each fabricated from a coating layer containing a metal complex tended to have high core resistance (resistance value and electrical resistivity).

The powder magnetic cores of Examples 1 to 5 were each verified to have such a high density that exceeded 7.60 (g/cm$^3$).

INDUSTRIAL APPLICABILITY

Since the powder magnetic core according to the present invention has high electrical resistivity and high magnetic flux density, it can be widely and effectively applied to electric and magnetic devices, such as inductors and various transformers, as well as various kinds of appliances, equipment, systems and the like provided with such electric, and magnetic devices.

DESCRIPTION OF REFERENCE SYMBOLS

1: composite magnetic particle, 2: core particle, 3: insulating passivation layer 3*a*: inner layer, 3*b*: outermost layer

What is claimed is:

1. A powder magnetic core comprising at least a composite magnetic particle, the composite magnetic particle comprising:

a core particle containing iron as a main component; and an insulating passivation layer formed on the core particle, wherein:

the insulating passivation layer has an inner layer formed on the core particle and an outermost layer formed on the inner layer;

the outermost layer contains iron oxide as a main component;

the inner layer and the outermost layer contain iron oxide and at least one kind of an oxide of nonferrous metal;

the inner layer contains more nonferrous metal than the outermost layer;

Fe is present in the outermost layer in an amount of 50 at. % or more;

the nonferrous metal includes at least one kind selected from the group consisting of aluminum, zirconium, silicon, titanium, chromium, manganese, sodium, lithium, zinc, barium and cesium; and a content of the nonferrous metal in the inner layer is from 5 to 80 at. %.

2. The powder magnetic core according to claim 1, wherein the core particle comprises a soft magnetic particle containing iron as a main component and an insulating film formed on a surface of the soft magnetic particle.

3. The powder magnetic core according to claim 1, wherein a sum of thicknesses of the insulating passivation layer is 50 nm or more and 1.5 μm or less.

4. The powder magnetic core according to claim 2, wherein the insulating film of the core particle contains iron phosphate.

5. The powder magnetic core according to claim 2, wherein a sum of thicknesses of the insulating passivation layer is 50 nm or more and 1.5 μm or less.

6. The powder magnetic core according to claim 4, wherein a sum of thicknesses of the insulating passivation layer is 50 nm or more and 1.5 μm or less.

* * * * *